US005491023A

United States Patent [19]
Tsai et al.

[11] Patent Number: 5,491,023
[45] Date of Patent: Feb. 13, 1996

[54] FILM COMPOSITION

[75] Inventors: Mingliang L. Tsai, East Brunswick, N.J.; Riccardo Balloni, Milano, Italy

[73] Assignee: Mobil Oil Corporation, Fairfax, Va.

[21] Appl. No.: 258,316

[22] Filed: Jun. 10, 1994

[51] Int. Cl.[6] .................................................... B32B 7/12
[52] U.S. Cl. ...................... 428/349; 428/35.3; 428/323; 428/463; 428/500; 427/446
[58] Field of Search ................................... 428/35.3, 349, 428/323, 463, 500

[56] References Cited

U.S. PATENT DOCUMENTS

| | | | |
|---|---|---|---|
| 3,442,686 | 5/1969 | Jones | 117/70 |
| 4,239,826 | 12/1980 | Knott, II. et al. | 428/500 |
| 4,345,005 | 8/1982 | All et al. | 428/461 |
| 4,360,551 | 11/1982 | Guarino et al. | 428/35.3 |
| 4,741,957 | 5/1988 | Park | 428/349 |
| 4,888,237 | 12/1989 | Balloni et al. | 428/347 |
| 4,956,210 | 9/1990 | Hoyt et al. | 428/35.3 |
| 5,004,647 | 4/1991 | Shah | 428/349 |
| 5,153,074 | 10/1992 | Migliorini | 428/463 |
| 5,192,620 | 3/1993 | Chu et al. | 428/461 |
| 5,225,272 | 7/1993 | Poole et al. | 428/323 |
| 5,330,831 | 7/1994 | Knoerzer et al. | 428/463 |

OTHER PUBLICATIONS 461,772 AZ; Min et al.; "Low Oxygen Transmissive Film", Dec. 18, 1991, pp. 2–4.
Kokai–267032; Sawada et al. "Transparent Plastic Film with Excellent Gas Barrier Properties", Oct. 24, 1989, pp. 1–23.
Kirk–Othmer; "Encyclopedia of Chemical Technology" (1983) pp. 848, 852–853 and 862–864.

*Primary Examiner*—Edith Buffalow
*Attorney, Agent, or Firm*—Alexander J. McKillop; Malcolm D. Keen; Jessica M. Sinnott

[57] ABSTRACT

A metallized multilayer film made from a polymer substrate, preferably polypropylene, is modified by a maleic anhydride modified propylene polymer which can be located on a surface of the substrate or incorporated within the substrate has a skin layer of polyvinyl alcohol which is capable of being metallized.

16 Claims, No Drawings

FILM COMPOSITION

CROSS REFERENCE TO RELATED APPLICATIONS

This application is related to copending application Ser. No. 08/051,120 filed on Apr. 2, 1993, which is incorporated herein by reference in its entirety.

1. Field of the Invention

The invention relates to a film composition which is capable of being metallized. More specifically, the invention relates to a polymeric substrate having a polyvinyl alcohol skin layer which is capable of being metallized. The invention also relates to metallized films.

2. Background of the Invention

Oriented plastic film, specifically biaxially oriented polypropylene film is widely used for packaging products, particularly foods. No single unmodified polymeric film, however, has the gas and moisture barrier characteristics needed for packaging.

Thus, multilayer polymeric films have been designed which have improved gas and moisture barrier properties. In U.S. Pat. No. 5,192,620 to Chu et al. a polypropylene film is coated with a blend of an ethylene-acrylic acid copolymer and polyvinyl alcohol (PVOH) to produce a polymeric film having better gas barrier properties. The film is then metallized to provide the film with better moisture barrier properties.

Since PVOH, on its own, adheres poorly to the preferred substrates, such as polypropylene, U.S. Pat. No. 5,153,074 to Migliorini suggests functionalizing the substrate with a maleic anhydride modified propylene homopolymer to act as a tie layer for the PVOH, see Col. 1, lines 49–62. For purposes of making a metallized film, however, the Migliorini patent is only concerned with ethylene vinyl alcohol copolymer (EVOH) which is not as good an oxygen barrier as PVOH.

A polymeric film having a PVOH skin layer is described in European Patent Application 461,772 A2. The moisture barrier properties of the PVOH layer are improved by employing crosslinked PVOH. There is no suggestion to metallize the film because the crosslinking agent makes metal adhesion unreliable; that is, it can vary from 0 to 70%.

The PVOH skins described in European Patent Application No. 461,772 and U.S. Pat. No. 5,192,620 are applied through a solution coating process. Pure PVOH applied by solution coating has a tendency to pose blocking problems when wound onto a roll. European Patent Application 461, 772 sought to remedy this problem by incorporating a crosslinking agent in the PVOH solution.

SUMMARY OF THE INVENTION

The present invention is directed to a film composition capable of being metallized comprising a polymeric substrate having a surface which is modified by a maleic anhydride modified propylene homopolymer or copolymer, the modified surface of the polymer substrate having a skin layer of polyvinyl alcohol.

The film composite of this invention offers excellent metal adhesion. It is resistant to flavor scalping and protects ink decals. Without primer, the film adheres well to ink and is ink printable. The film also provides excellent flavor/aroma barrier properties, lamination bond strength and optical clarity.

DETAILED DESCRIPTION OF THE INVENTION

The multilayer film structure of this invention comprises a substrate of polyolefin, typically polypropylene. The preferred polypropylene matrix material has the following characteristics: density of 0.91 g.cc; melting point of 160° C. or higher; melt flow rate of 2 to 4.

The polyolefin substrate is modified by a maleic anhydride modified polypropylene. The maleic anhydride modified polypropylene skin layer can be prepared by any process, for example, the process disclosed in U.S. Pat. Nos. 3,433,777 and 4,198,327, the disclosures of which are incorporated herein by reference in their entireties. A simple process for its preparation is described in U.S. Pat. No. 5,153,074. The maleic anhydride modified polypropylene can also be interblended into the substrate, by melt blending it with the substrate polyolefin or it can be coextruded with the substrate polymer. A commercially available maleic anhydride modified polypropylene or propylene copolymer has the following physical characteristics: density of 0.90 (ASTM D1505), Vicat softening point of 143° C. (ASTM D1525); Shore hardness of 67° C. (ASTM 2240); melting point of 160° C. (ASTM D2117). The maleic anhydride modified polypropylene acts as a tie layer which adheres the substrate to the PVOH. It is important to use the maleic anhydride modified polypropylene since without it the substrate is incompatible with the PVOH. Maleic anhydride modified polypropylene is sold commercially by a variety of sources, e.g. it is sold under the tradename "ADMER" by Mitsui, "BYNEL" by DuPont, and "PLEXAR" by Quantum. Usually, if extrusion coated, the modified substrate is stretched in the machine direction 4 to 7 times and then flame treated.

A layer of polyvinyl alcohol (PVOH) is applied to the surface of the modified substrate. In instances where the substrate is coextruded with the maleic anhydride modified polypropylene, it is important to apply the PVOH to the modified surface, otherwise, the PVOH will have difficulty adhering to the substrate. The PVOH can be applied in a thin layer by any effective process. The layer can range in thickness from 0.01 mil to 0.20 mil. Three processes of note are 1) coextrusion of a PVOH skin and the modified substrate with the use of a selector plug or multicavity die; 2) extrusion coating the PVOH layer onto the surface of the modified substrate between the machine direction orientation and the transverse direction orientation; 3) co-lamination of a thin film of PVOH onto the surface of the modified polypropylene sheet between the machine direction orientation step and the transverse direction orientation step. Usually, when the PVOH layer is extrusion coated onto the substrate, the film is stretched 5 to 12 times in the transverse direction and flame treated.

For extrusion coating and co-lamination, it is preferable to corona or flame treat the bonding surface of the substrate prior to application of the PVOH.

A heat sealable film can be applied to the substrate on the side opposite to the PVOH. This can be accomplished by coextruding a heat sealable polymer, copolymer or trimer, such as ethylene-propylene-butene, onto the substrate.

The PVOH skin is then metallized by deposition of a metal thereon. Any typical process for metallization known in the art can be employed. Typical metals contemplated are aluminum, copper, chromium, magnesium, nickel, zinc, tin, silver, gold, titanium, silicon, bismuth, etc., or any compound containing the foregoing metals or combination thereof. An aluminum coating, which is most typically employed, can be of a thickness which yields an optical density of about 1.5 to 3.5. The thickness of the aluminum coating needed to meet this optical density is, typically, from about 50 to 1000 angstroms. The PVOH surface adequately adheres to metal. Although we have found that it is advantageous to surface treat, by flame or corona treatment, the PVOH prior to metallization, this is not necessary.

We discovered that extrudable grades of PVOH which can be melt processed avoid the blocking problems which are experienced when PVOH is applied through a solution coating process, as described in European Patent Application No. 461,772. Since PVOH is melt processed there are no blocking problems and the film can be easily wound into a roll. Also because of the extrusion process, a layer ranging from 0.01 mil to 0.20 mil can be applied, this cannot be accomplished from the solution coating processes disclosed in European Patent Application No. 461,772 or U.S. Pat. No. 5,192,620 which usually achieve a layer ranging from about 0.02 to 0.06 mil. A commercial source of extrudable PVOH is Vinex resin manufactured by Air Products and Chemicals, Inc.

The advantages of using 100% PVOH in multilayer films, as disclosed herein are extensive. Since 100% PVOH is employed, the film is a better oxygen barrier than previous films made with PVOH copolymers or blends. We have also found that the surface properties provided by the PVOH are responsible for superior metal adhesion, ink printing and lamination. The surface tension of PVOH is high. Without flame or corona treatment, the surface tension is about 37 dyne/cm, as compared to the surface tension of polypropylene of 29 dyne/cm. After surface treatment, the surface tension of PVOH can be greater than 55 dyne/cm. Additionally, since PVOH possesses an extremely high melting and softening point, ranging from higher than 170° C., the film exhibits no metal fracture during extrusion lamination using 10 lbs/rm LDPE at 620° F. The following Table 1 presents a comparison between the melting point and metal fracture of multi-layered polypropylene films having skin layers of EVOH, PVOH/EAA and 100% PVOH:

TABLE 1

| POLYMER | MELTING POINT, °C. | METAL FRACTURE |
|---------|--------------------|----|
| EVOH    | 158                | little–none |
| PVOH/EAA* | –100             | some |
| PVOH    | >170               | None |

*ethylene acrylic acid

Any grade of PVOH can be employed for the skin layer. In general partially hydrolyzed grades (of about 88% hydrolysis) can be used and even PVOH with 70% or higher hydroxyl content can be used.

The heat sealable layer employed herein and applied during coextrusion can be an ethylene propylene (EP) copolymer or an ethylene propylene butene-1 (EPB) terpolymer which, as noted above is, typically, located opposite the PVOH skin layer. The ratio of ethylene to propylene to butene-1 can be from 0 to 15% ethylene, 70 to 100% propylene and 0 to 15% butene-1; that is, 2% ethylene, 94% propylene and 4% butene-1.

A printable surface which is adhered to the metallized film by an adhesive such as low density polyethylene can be any polymer such as polyolefin homopolymer, copolymer or terpolymer, polycarbonate, polyester, etc. The characteristic of the printable surface is one with a surface free energy of 34 dynes/cm or higher.

As demonstrated in the following examples, which were actually conducted, the PVOH in combination with the metallization and coating with an appropriate lamination film will improve oxygen barrier, moisture barrier and aroma barrier properties over other structures. While, in these examples, metallization is accomplished by conventional vacuum deposition, it can also be accomplished by conventional vapor deposition. Additionally, although polypropylene is shown as the substrate, other polyolefin films may be used such as polyethylene, polyesters, polybutene, olefin copolymers, polyamides, polycarbonate, polyacrylonitrile, etc.

EXAMPLE 1

This example is for comparative purposes.

A polypropylene homopolymer film was coextruded to make a 0.90 mil film, using maleic anhydride grafted polypropylene as a tie layer and an ethylene-propylene-butene terpolymer as a heat seal layer on the other side. The film was metallized on the maleic anhydride grafted polypropylene side with aluminum in a vacuum to an optical density of 2.5. The film was then extrusion laminated with 75 gauge polypropylene film using 10 lbs/ream LDPE hot melt. The properties of the multilayer film are set forth in Table 1.

EXAMPLE 2

This example demonstrates a process for making a film in accordance with the present invention which has superior air and moisture barrier properties.

A polypropylene film was made by coextruding a polypropylene substrate with an ethylene-propylene-butene terpolymer sealant on one side and a tie skin of maleic anhydride grafted polypropylene skin on the opposite side. The film was stretched in the machine direction five times. The film was flame treated on the tie skin side. PVOH was extrusion coated on the treated tie skin side and the film was stretched in the transverse direction eight times before it was again flame treated on the PVOH side and wound up in a mill roll. The film was vacuum metallized on the PVOH side with aluminum to an optical density of 2.5. The aluminum coating thickness was about 300 to about 500 angstroms. The film was extrusion laminated with 75 gauge polypropylene film using 10 lbs/ream LDPE hot melt. The properties of the film are set forth in the following Table 1.

Each film was made to a thickness of 0.90 mil. The tie layer (maleic anhydride grafted polypropylene) was about 0.05 mil in both examples.

Barrier properties were measured on the metallized films produced. Water vapor transmission rate (g/100 in$^2$/24 hr) was measured at 100° F., 90% RH. Oxygen transmission rate (cc/100 in$^2$/24 hr) was measured at 73° F., 0% RH. The level of aluminum adhesion to the substrate was measured by reporting the % metal pickoff after 3 pulls on the aluminum surface with Scotch Brand 610 tape. The lamination bond (g/in) was measured by laminating the metallized surface to a layer of polypropylene film of about 0.75 mil in thickness using 10 lb/ream of molten low density polyethylene at a melt temperature of 325° C. in a laminating machine. The film obtained was then pulled apart to measure the lamination bond strength in a conventional pulling machine. Typical lamination bond strength testing machines are the Alfred Suter Tester and the Sintech Tensile Tester. Properties obtained are as follows:

TABLE 2

| Ex. | Metallizable Skin | Treatment Level, dyne/cm | OTR[1] | WVTR[2] | Metal Pickoff, % | Lamination Bond, g/in |
|---|---|---|---|---|---|---|
| 1 | PP (Control) | 40 | 10.0 | 0.15 | 80 | 80 |
| 2 | PVOH (6 ga) | >56 | 0.024 | 0.06 | 5 | 171 |

[1]oxygen transmission rate
[2]water vapor transmission rate

As shown in Table 1 the oxygen barrier and moisture barrier properties of the film are excellent and the metal-to-film adhesion is appropriate for most purposes.

What is claimed is:

1. A metallized film composition comprising a polymer substrate having a surface which is modified by an adhesion promoting agent, the modified surface of the polymer substrate having a skin layer of 100% polyvinyl alcohol, the skin layer having a metal layer directly thereon.

2. The metallized film composition of claim 1 in which the adhesion promoting agent is a maleic anhydride modified propylene homopolymer or copolymer.

3. The metallized film composition of claim 1 in which the modified surface of the substrate is treated by either flame treatment or corona treatment.

4. The metallized film composition of claim 1 in which the polyvinyl alcohol skin layer is free of crosslinking agent.

5. The metallized film composition of claim 1 in which the polyvinyl alcohol skin layer is extrudable polyvinyl alcohol.

6. The metallized film composition of claim 5 in which the polyvinyl alcohol skin layer is a partially hydrolyzed grade.

7. The metallized film composition of claim 6 in which the polyvinyl alcohol skin layer is at least 70% hydrolyzed.

8. The metallized film composition of claim 1 in which there is a heat sealable layer on the substrate opposite the PVOH.

9. A process for making a metallized film composition comprising the steps of:

(a) providing a polymeric substrate film;

(b) modifying at least one surface of the polymeric substrate film with a maleic anhydride modified polypropylene homopolymer or copolymer;

(c) applying an oxygen barrier consisting essentially of polyvinyl alcohol to the modified surface of the substrate; and (d) metallizing the polyvinyl alcohol surface formed in step (c).

10. The process of claim 9 in which the polymeric substrate is a homopolymer or copolymer of propylene.

11. The process of claim 9 which further comprises treating a surface of the polymeric film substrate opposite the polyvinyl alcohol with a heat sealable composition.

12. A metallized film composition made by the process of claim 9.

13. A metallized film composition made by the process of claim 10.

14. A metallized film composition made by the process of claim 13.

15. The process of claim 9 in which the film of step (b) is stretched in the machine direction 4 to 7 times and then flame treated.

16. The process of claim 9 in which the film of step (c) is stretched in the transverse direction 5 to 12 times and then flame treated.

* * * * *